US011695990B2

(12) United States Patent
Manus et al.

(10) Patent No.: US 11,695,990 B2
(45) Date of Patent: *Jul. 4, 2023

(54) OPTIMIZATION OF BROADCAST EVENT EFFECTIVENESS

(71) Applicant: Bliss Point Media, Inc., Santa Monica, CA (US)

(72) Inventors: Justin Manus, Oakland, CA (US); Sean Odium, Santa Monica, CA (US); Anand V. Bodapati, Los Angeles, CA (US)

(73) Assignee: Bliss Point Media, Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/719,804

(22) Filed: Apr. 13, 2022

(65) Prior Publication Data
US 2022/0239981 A1    Jul. 28, 2022

Related U.S. Application Data

(63) Continuation of application No. 17/186,688, filed on Feb. 26, 2021, now Pat. No. 11,368,752, which is a (Continued)

(51) Int. Cl.
| | |
|---|---|
| H04N 21/442 | (2011.01) |
| H04N 21/81 | (2011.01) |
| G06Q 10/0639 | (2023.01) |
| H04N 21/25 | (2011.01) |
| H04N 21/24 | (2011.01) |
| G06N 20/00 | (2019.01) |
| G06N 7/01 | (2023.01) |

(52) U.S. Cl.
CPC ....... *H04N 21/44222* (2013.01); *G06N 7/01* (2023.01); *G06N 20/00* (2019.01); *G06Q 10/06393* (2013.01); *H04N 21/2407* (2013.01); *H04N 21/25* (2013.01); *H04N 21/812* (2013.01)

(58) Field of Classification Search
None
See application file for complete search history.

(56) References Cited

U.S. PATENT DOCUMENTS

| | | |
|---|---|---|
| 5,704,017 A | 12/1997 | Heckerman et al. |
| 6,029,176 A | 2/2000 | Cannon |

(Continued)

OTHER PUBLICATIONS

Non-Final Office Action dated Jun. 1, 2022 from corresponding U.S. Appl. No. 17/342,454.

*Primary Examiner* — An Son P Huynh
(74) *Attorney, Agent, or Firm* — Perkins Coie LLP

(57) ABSTRACT

Introduced herein are methods and systems for determining machine learning marketing strategy. For example, a computer-implemented method according to the disclosed technology includes steps of identifying one or more business metrics to be driven by a marketing plan; generating one or more response functions of the business metrics by performing a machine learning process on a marketing dataset; optimizing a spending subject of the marking plan subject to constraints to generate a marketing strategy based on multiple decision variables; and presenting the marketing strategy to an advertiser.

20 Claims, 11 Drawing Sheets

Related U.S. Application Data continuation-in-part of application No. 16/595,648, filed on Oct. 8, 2019, now Pat. No. 10,939,166, which is a continuation of application No. 16/280,765, filed on Feb. 20, 2019, now Pat. No. 10,491,951, which is a continuation of application No. 15/495,561, filed on Apr. 24, 2017, now Pat. No. 10,257,572.

(60) Provisional application No. 62/441,883, filed on Jan. 3, 2017.

(56) References Cited

U.S. PATENT DOCUMENTS

| | | | |
|---|---|---|---|
| 6,239,794 | B1 | 5/2001 | Yuen et al. |
| 6,388,714 | B1 | 5/2002 | Schein et al. |
| 6,756,997 | B1 | 6/2004 | Ward, III et al. |
| 7,165,098 | B1 | 1/2007 | Boyer et al. |
| 7,166,098 | B1 | 1/2007 | Steward et al. |
| 7,373,650 | B1 | 5/2008 | Rodriguez et al. |
| 7,937,725 | B1 | 5/2011 | Schaffer et al. |
| 7,962,935 | B2 | 6/2011 | Kurosaki et al. |
| 8,046,801 | B2 | 10/2011 | Ellis et al. |
| 8,108,886 | B1 | 1/2012 | Murahashi et al. |
| 8,181,199 | B2 | 5/2012 | Jeong |
| 8,196,168 | B1 | 6/2012 | Bryan et al. |
| 8,204,779 | B1 | 6/2012 | Hughes et al. |
| 8,327,395 | B2 | 12/2012 | Lee et al. |
| 8,352,980 | B2 | 1/2013 | Howcroft |
| 8,458,745 | B2 | 6/2013 | Shanks et al. |
| 8,495,683 | B2 * | 7/2013 | van Coppenolle .. H04N 21/812 725/9 |
| 8,607,295 | B2 | 12/2013 | Bhatia et al. |
| 8,677,472 | B1 | 3/2014 | Dotan et al. |
| 8,706,550 | B1 | 4/2014 | Chalawsky et al. |
| 8,745,647 | B1 | 6/2014 | Shin et al. |
| 8,789,109 | B2 | 7/2014 | Joh |
| 8,856,846 | B2 | 10/2014 | Applegate et al. |
| 8,930,204 | B1 | 1/2015 | Igoe et al. |
| 9,049,076 | B1 | 6/2015 | Ramachandran et al. |
| 9,363,464 | B2 | 6/2016 | Alexander |
| 9,420,320 | B2 | 8/2016 | Doe |
| 9,571,877 | B2 * | 2/2017 | Lee ...................... H04N 21/252 |
| 9,578,379 | B1 | 2/2017 | Klappert et al. |
| 9,626,159 | B2 | 8/2017 | Mahmud |
| 9,736,503 | B1 | 8/2017 | Bakshi et al. |
| 9,838,755 | B1 | 12/2017 | Kodige et al. |
| 10,110,578 | B1 | 10/2018 | Baer et al. |
| 10,178,421 | B2 | 1/2019 | Thomas et al. |
| 10,185,971 | B2 | 1/2019 | Hood et al. |
| 10,257,572 | B2 | 4/2019 | Manus et al. |
| 10,277,944 | B2 | 4/2019 | Venetucci et al. |
| 10,305,978 | B2 | 5/2019 | Fang et al. |
| 10,455,276 | B2 | 10/2019 | Guerra |
| 10,491,951 | B2 | 11/2019 | Manus |
| 10,749,852 | B2 | 8/2020 | Thomas |
| 10,841,651 | B1 | 11/2020 | Kamezos et al. |
| 10,853,735 | B1 * | 12/2020 | Gan ........................ G06N 20/10 |
| 11,064,255 | B2 | 7/2021 | Vandoros |
| 11,212,568 | B2 * | 12/2021 | Thomas ................ H04L 65/762 |
| 2002/0056087 | A1 | 5/2002 | Berezowski et al. |
| 2002/0174430 | A1 | 11/2002 | Ellis et al. |
| 2003/0067544 | A1 | 4/2003 | Wada |
| 2003/0093792 | A1 | 5/2003 | Labeeb et al. |
| 2003/0110499 | A1 | 6/2003 | Knudson et al. |
| 2003/0115585 | A1 | 6/2003 | Barsness et al. |
| 2003/0145323 | A1 | 7/2003 | Hendricks et al. |
| 2004/0133448 | A1 | 7/2004 | Higashi et al. |
| 2004/0261026 | A1 | 12/2004 | Corson |
| 2005/0149964 | A1 | 7/2005 | Thomas et al. |
| 2006/0020962 | A1 | 1/2006 | Stark et al. |
| 2006/0212900 | A1 | 9/2006 | Ismail et al. |
| 2006/0282311 | A1 | 12/2006 | Jiang |
| 2007/0136322 | A1 | 6/2007 | Cormack et al. |
| 2007/0136753 | A1 | 6/2007 | Bovenschulte et al. |
| 2007/0260703 | A1 | 11/2007 | Ardhanar et al. |
| 2007/0288965 | A1 | 12/2007 | Murakami et al. |
| 2008/0120650 | A1 | 5/2008 | Orihara et al. |
| 2008/0140524 | A1 | 6/2008 | Anand et al. |
| 2008/0271098 | A1 | 10/2008 | Kalaboukis et al. |
| 2009/0064219 | A1 | 5/2009 | Minor |
| 2009/0132346 | A1 | 5/2009 | Duggal et al. |
| 2010/0031162 | A1 | 2/2010 | Wiser et al. |
| 2010/0153885 | A1 | 6/2010 | Yates |
| 2010/0251295 | A1 | 9/2010 | Amento et al. |
| 2010/0319043 | A1 | 12/2010 | Jain |
| 2010/0333137 | A1 | 12/2010 | Hamano et al. |
| 2011/0016479 | A1 | 1/2011 | Tidwell et al. |
| 2011/0069940 | A1 | 3/2011 | Shimy et al. |
| 2011/0078572 | A1 | 3/2011 | Milazzo |
| 2011/0078740 | A1 | 3/2011 | Bolyukh et al. |
| 2011/0119595 | A1 | 5/2011 | Bydeley et al. |
| 2011/0164175 | A1 | 7/2011 | Chung et al. |
| 2011/0238472 | A1 | 9/2011 | Sunkada |
| 2011/0289422 | A1 | 11/2011 | Spivack et al. |
| 2011/0321072 | A1 | 12/2011 | Patterson et al. |
| 2012/0137316 | A1 | 5/2012 | Elizarov et al. |
| 2012/0151511 | A1 | 6/2012 | Bernard et al. |
| 2012/0278179 | A1 * | 11/2012 | Campbell ........... G06Q 30/0255 705/14.69 |
| 2012/0278330 | A1 | 11/2012 | Campbell et al. |
| 2013/0080264 | A1 | 3/2013 | Umeda |
| 2013/0167168 | A1 | 6/2013 | Ellis et al. |
| 2013/0173765 | A1 | 7/2013 | Korbecki |
| 2013/0311408 | A1 | 11/2013 | Bagga et al. |
| 2014/0002749 | A1 | 1/2014 | Pora et al. |
| 2014/0067855 | A1 | 3/2014 | Shartzer et al. |
| 2014/0068692 | A1 * | 3/2014 | Archibong ......... H04N 21/6334 725/116 |
| 2014/0100944 | A1 | 4/2014 | Zhu et al. |
| 2014/0104495 | A1 | 4/2014 | Preston et al. |
| 2014/0281978 | A1 | 9/2014 | Ye et al. |
| 2014/0289009 | A1 | 9/2014 | Campbell |
| 2014/0304069 | A1 | 10/2014 | Lacey et al. |
| 2014/0325401 | A1 | 10/2014 | Wattenhofer et al. |
| 2014/0358645 | A1 | 12/2014 | Ehrman et al. |
| 2015/0046251 | A1 | 2/2015 | Smith |
| 2015/0213389 | A1 | 6/2015 | Modarresi |
| 2015/0278735 | A1 | 10/2015 | Mizuta et al. |
| 2015/0358677 | A1 | 12/2015 | Papa |
| 2015/0358818 | A1 | 12/2015 | Dipaola |
| 2015/0370814 | A1 | 12/2015 | Liodden et al. |
| 2016/0050129 | A1 | 2/2016 | Hoyne |
| 2016/0117720 | A1 | 4/2016 | Hood et al. |
| 2016/0330526 | A1 | 11/2016 | Marchetti et al. |
| 2016/0381427 | A1 | 12/2016 | Taylor et al. |
| 2017/0034558 | A1 | 2/2017 | Pottier |
| 2017/0034591 | A1 | 2/2017 | Ray et al. |
| 2017/0078719 | A1 | 3/2017 | Bettendorf et al. |
| 2017/0126641 | A1 | 5/2017 | Thomas et al. |
| 2017/0127104 | A1 | 5/2017 | Thomas et al. |
| 2017/0132553 | A1 | 5/2017 | Theirl et al. |
| 2017/0195731 | A1 | 7/2017 | Girlando et al. |
| 2017/0230846 | A1 | 8/2017 | Wang et al. |
| 2017/0255630 | A1 | 9/2017 | Li et al. |
| 2017/0257653 | A1 * | 9/2017 | Farré Guiu ...... H04N 21/23418 |
| 2018/0020963 | A1 | 1/2018 | Friant |
| 2018/0084310 | A1 | 3/2018 | Katz et al. |
| 2018/0109678 | A1 | 4/2018 | Sharma |
| 2018/0189821 | A1 | 7/2018 | Masson et al. |
| 2018/0288119 | A1 | 10/2018 | Lee et al. |
| 2019/0182545 | A1 | 6/2019 | Manus et al. |
| 2019/0320223 | A1 | 10/2019 | Malhotra et al. |

* cited by examiner

OPTIMIZATION OF BROADCAST EVENT EFFECTIVENESS

CROSS-REFERENCE TO RELATED APPLICATIONS

This application is a continuation of U.S. patent application Ser. No. 17/186,688, filed Feb. 26, 2021, which is a continuation-in-part of U.S. patent application Ser. No. 16/595,648, filed Oct. 8, 2019, now U.S. Pat. No. 10,939,166, issued Mar. 2, 2021, which is a continuation of U.S. patent application Ser. No. 16/280,765, filed Feb. 20, 2019, now U.S. Pat. No. 10,491,951, issued Nov. 26, 2019, which is a continuation of U.S. patent application Ser. No. 15/495,561, filed Apr. 24, 2017, now U.S. Pat. No. 10,257,572, issued Apr. 9, 2019, which claims priority to U.S. Provisional Patent Application Ser. No. 62/441,883, filed Jan. 3, 2017. The aforementioned applications are incorporated herein by reference in their entirety.

TECHNICAL FIELD

The disclosure relates to machine learning and constrained optimization. More particularly, this disclosure relates to the use of machine learning to attribute events within a dataset to changes in a quantifiable performance metric.

BACKGROUND

Making decisions on how to market a product or service is usually a nebulous affair. Results are not generally clear cut or quantifiable. How does one define marketing success? How does one know how to attribute some portion of that success to a given advertisement? How does one learn from that attribution? Presently these questions don't have simple answers and are addressed by humans often using arbitrary or convoluted systems. Developing the final marketing strategy becomes very arduous in dealing with the large amount of data, such as media records, product/service key performance indicator (KPI) data, and offers.

DETAILED DESCRIPTION

A marketer, in a general sense, has a decision as to how to spend their money. These decisions occur at the macro level at the portfolio level. For example, how much does the marketer spend at a first high-traffic web site, versus another high-traffic website, versus TV; effectively which channel? At the micro level, the marketer determines tighter details such as which keywords to bid on, what audience demographic to target, what time of day to run, what day of the week, which creative copy, etc. Herein described is a system and method to receive marketing data and process that data in order to determine a quantifiable value to each of these choices, thereby enabling the marketer to make better decisions.

In attributing the value of a given advertisement or broadcast event to success or failure, the concept of time is very important. Each single time a broadcast event runs, the system records a very precise time stamp, down to the second. The system correlates the time stamp of each broadcast event to a quantifiable metric that represents success. The quantifiable metrics are sometimes referred to as key performance indicators (KPI). The time stamp indicates when a broadcast event concluded (e.g., the time that a television or radio advertisement ended, the time that a billboard advertisement stopped being displayed, etc.), so that the effectiveness of the broadcast event following its conclusion can be analyzed.

KPIs are discreet consumer actions and are selected based on appropriateness to a given product/service. Broad examples include: purchases of the product/service, mailing list or account sign-ups, incoming phone calls, or consumer signatures. Examples focused on interactions with websites or applications include: views, downloads, clicks, logins, or quantifiable functional activity (e.g., a user providing input to a game). Chosen KPIs are measured as a function of time. The duration of the time may vary tremendously case-to-case. A given KPI data history may include only 2-3 weeks of data or 20 years of data. Thus, the system uses as input ads with a precise time stamp indicating the conclusion of a broadcast event and KPIs measured as a function of time. The system generates an effectiveness rating for each of the broadcast events and/or granular components of the broadcast event. This data may be plotted as depicted in FIG. 1.

Figure 1:
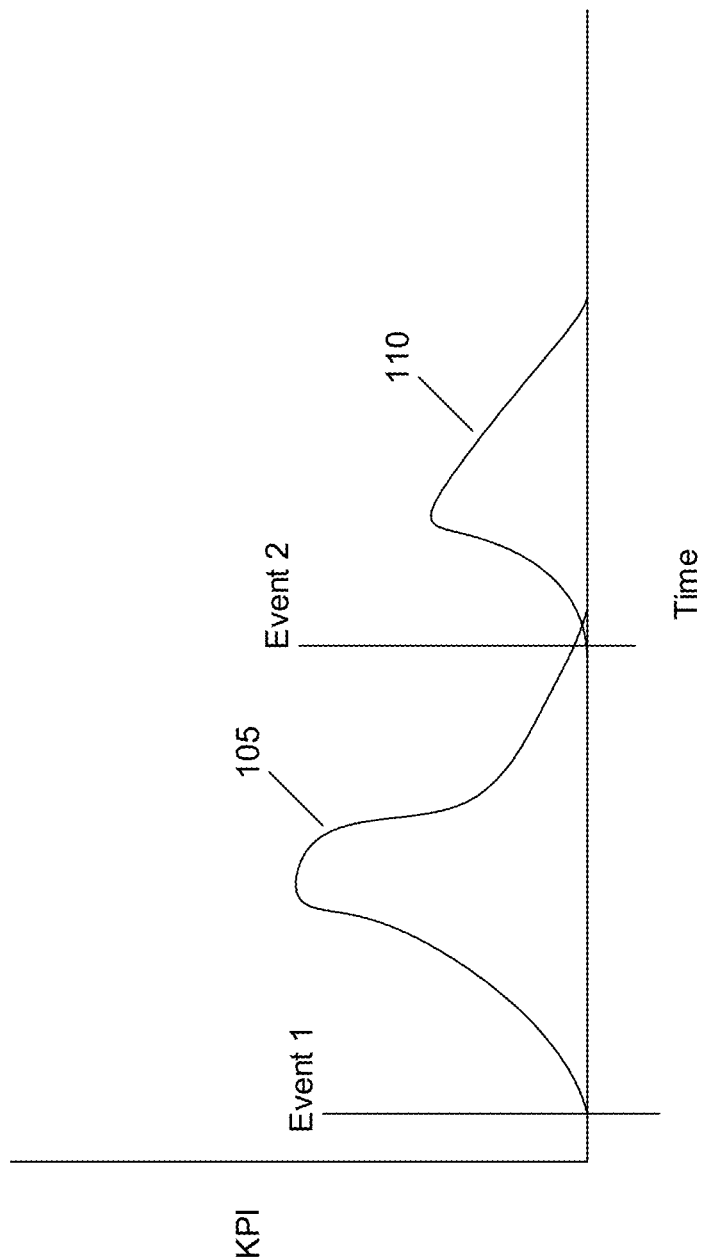
FIG. 1 is a graphical plot of a quantifiable metric measured as a function of time and including two isolated broadcast events.

FIG. 1 is a graphical plot of a quantifiable metric measured as a function of time and including two isolated broadcast events. In order to determine an effectiveness rating, an effectiveness period is assigned to each broadcast event. The effectiveness period is indicated by KPI measurements after the time stamp of each broadcast event. Since a time stamp of a broadcast event indicates the time at which that broadcast event ended, the effectiveness period for measuring the quantifiable metric of a broadcast event occurs after the conclusion of the broadcast event. The effectiveness period includes two periods: ramp-up, and ramp-down. The ramp-up period is the latency between the broadcast event occurring and the peak of the response. The ramp down period is from the peak of the response back to a background baseline level. A parameterized curve is integrated (area under curve) in order to develop a magnitude of effectiveness.

FIG. 1 depicts two curves, each occurring after broadcast events 1 and 2. The vertical lines labeled "Event 1" and "Event 2" indicate the times corresponding to the time stamps at which event 1 and event 2 ended, respectively. Curve 105, occurring after the time stamp corresponding to event 1, indicates KPI measurements measured following event 1. Curve 110, occurring after the time stamp corresponding to event 2, indicates KPI measurements measured following event 2. Integrating each curve provides an effectiveness rating for the preceding broadcast event.

Figure 2:
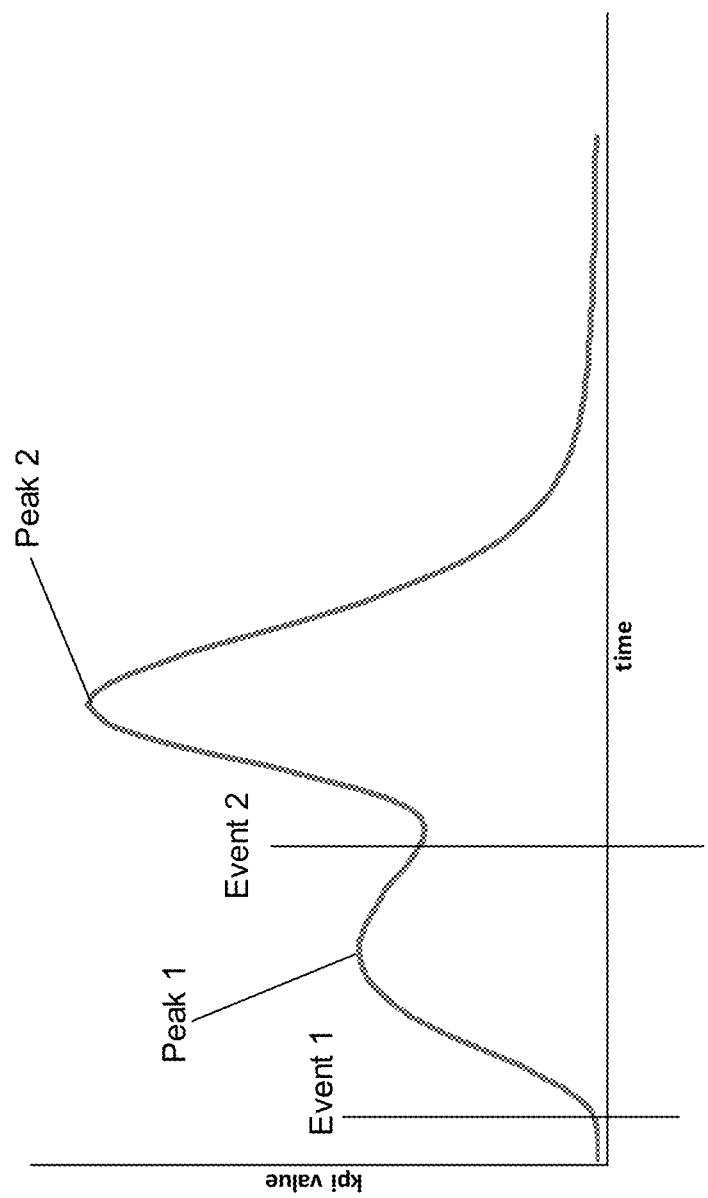
FIG. 2 is a graphical plot of a quantifiable metric measured as a function of time and including two overlapping broadcast events.

FIG. 2 is a graphical plot of a quantifiable metric measured as a function of time, and including two overlapping broadcast events. The vertical lines labeled "Event 1" and "Event 2" indicate the times corresponding to the time stamps at which event 1 and event 2 ended, respectively. In some cases, the system runs into broadcast event collision, where there are events with time stamps running very close together. In other words, broadcast event collision can sometimes occur when there is a short time period between the conclusion of a first broadcast event and the conclusion of a second broadcast event. In some embodiments, the system performs wave decomposition to attribute KPI success/failure to broadcast events with effective periods that overlap. To do this, the system examines the KPI history for peak responses and then decomposes each peak into a sum of multiple curves.

As pictured in FIG. 2, the effectiveness periods, as measured by ramp up and ramp down periods, overlap. Raw KPI data does not provide the nuance of attribution, thus the attribution must be estimated. In some embodiments, the curve is estimated through machine-learned models of previous KPI data. In some embodiments, the estimation is determined using the derivative of the slope of the KPI data as two curves overlap.

Figure 3:
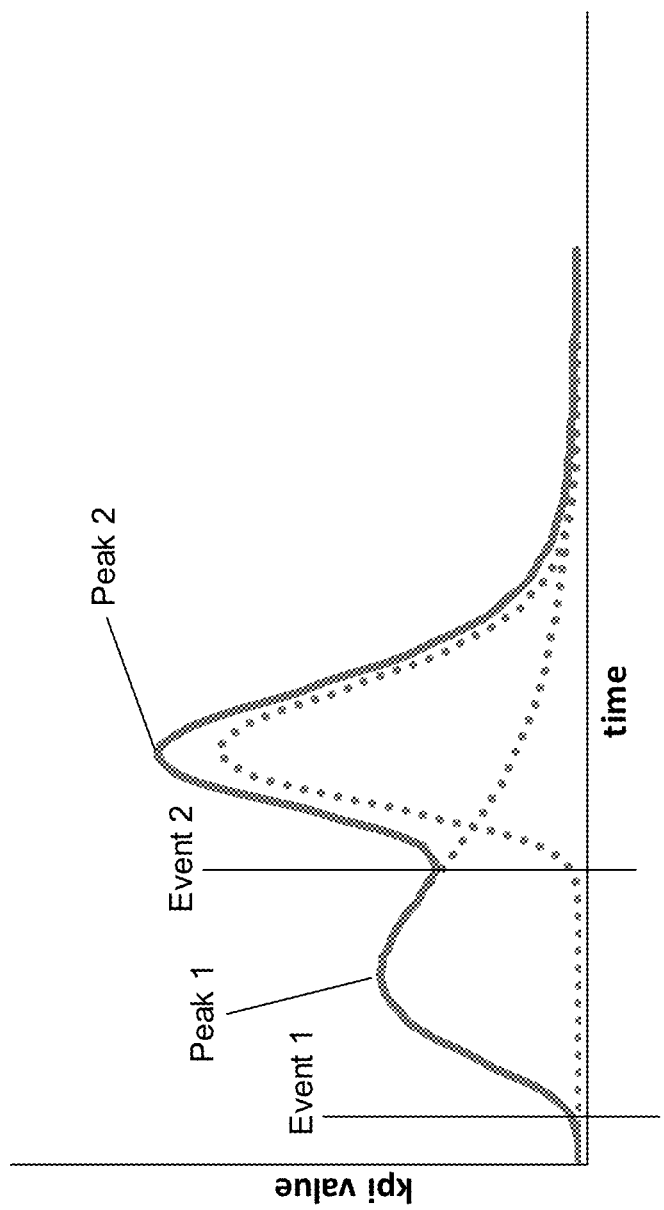
FIG. 3 is a second example of a graphical plot of a quantifiable metric measured as a function of time and including two overlapping broadcast events.

FIG. 3 is an example of a graphical plot of a quantifiable metric measured as a function of time, and including two overlapping broadcast events and attribution curves. The vertical lines labeled "Event 1" and "Event 2" indicate the times corresponding to the time stamps at which event 1 and event 2 ended, respectively. In some cases, broadcast event collision is not clear. FIG. 3 includes the effectiveness periods of events 1 and 2 corresponding to peaks 1 and 2, respectively. The effect of the conclusion of event 2 after the conclusion of event 1 is the acceleration of the KPI increase, which causes the KPI values to level off for a period of time. In this case, the system identifies peak 2 based on the expectation that the ramp down period from event 1 is a smooth curve. Further, the KPI value for event 1 is increased based upon the ramp up period for event 2. Therefore, the effectiveness rating attributable to event 1 is the integral of the curve below the dotted line associated with peak 1. Conversely, the effectiveness rating attributable to event 2 is the integral of the curve above the dotted line associated with peak one. Where to place the dotted line may be determined by substituting a value for either broadcast event using a comparable event in the KPI history data. Alternatively, or in conjunction, the present data is used to make projections based on the slope of the KPI history curve surrounding each peak, and at curve intersections.

Figure 4:
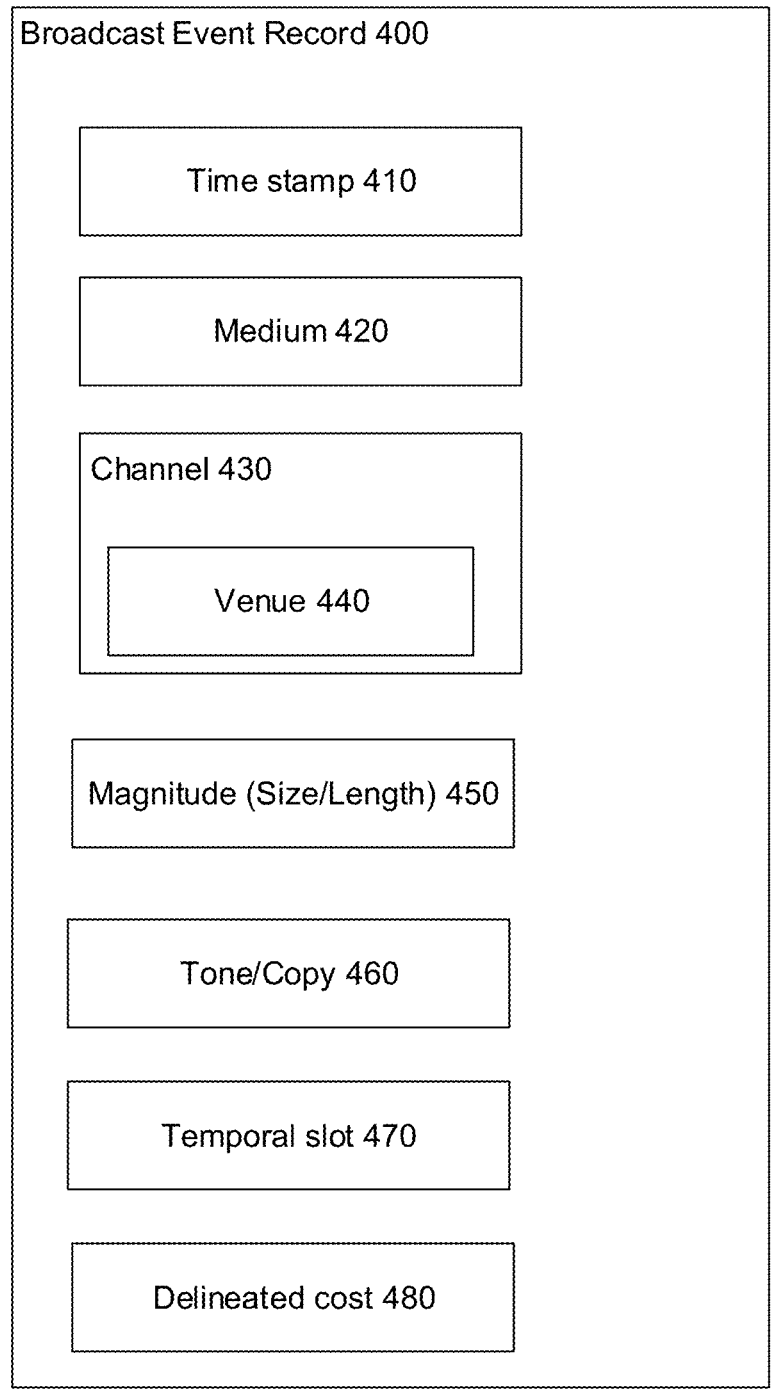
FIG. 4 is a block diagram of a broadcast event record.

FIG. 4 is a block diagram of a broadcast event record. Each broadcast event includes a number of details to which an effectiveness is credited. In order to process necessary data, the system stores broadcast event records 400 within a database. As previously discussed, a broadcast event record 400 for a given broadcast event has a very precise time stamp 410. Time stamp 410 indicates when the broadcast event corresponding to a broadcast event record 400 concluded (e.g., the time that a television or radio advertisement ended, the time that a digital display finished running an advertisement, the time that a billboard advertisement was completed etc.), so that the effectiveness of the broadcast event following its conclusion can be analyzed. The time stamp 410, like the rest of the data stored with a given broadcast event record 400 is metadata.

Broadcast events include a number of important metadata characteristics stored in a broadcast event record 400. The medium 420 of the subject broadcast event refers to the type of proclamation the broadcast event is. Example mediums 420 include: pictographic, auditory, video, text, or multimedia. The channel 430 of the subject broadcast event refers to where the broadcast event may be found. Example channels 430 include: websites, TV, radio, podcasts, and physical signage. Channels 430 further include a sub-characteristic of venue 440. The venue 440 is the particular implementation of the selected channel 430. For example a particular website (e.g., Facebook or, more specifically, a particular Facebook group page), a particular TV channel (e.g., ESPN, or, more specifically, EPSN in northern California), a particular TV show (e.g., morning news), a particular radio channel (e.g., FM 105.3 in San Jose, Calif.), a particular podcast (e.g., Perpetual Motion), or a signage (e.g., billboard on 1st and Main St.).

Another characteristic is the magnitude 450 of the broadcast event. Magnitude 450 refers to details such as the length of the event (e.g., a television commercial that is 15, 30, or 60 seconds long), or the size of the event (e.g., signage that is 8'×4'). The tone 460 of the broadcast event is the sort of feelings the event is intended to invoke in consumers. For example, the broadcast event may intend to invoke pride, urgency, exclusivity, or other traits in the consumer. In some embodiments, where the tone 460 is similar, different sets of specific copy are compared instead.

The temporal slot 470 of the subject broadcast event refers to when the event occurs. Examples include, mornings, prime time, seasonal, "halfway through" some subject work, or other suitable temporal placements known in the art. The temporal slot 470 may also be conjoined with the venue 440. In some embodiments, the venue 440 has a very specific temporal slot 470 (e.g., Sunday Night Football is on at the same time every week).

Finally, advertising includes an associated cost. However, varying some of the above characteristics affects the cost. Thus, the cost is a delineated cost 480 that is attributable in part to each of the above characteristics. For example, a given venue 440 may have a greater cost for high magnitude events than for low magnitude events.

Each of the above characteristics of a broadcast event record 400 provide a more granular look at each event. When placed along with KPI history data, an effectiveness value can be determined for these characteristics individually. This is performed by isolating particular characteristics. Where two events have similar characteristics with one variance, changes in the KPI history data are attributable to that difference in characteristic. The particular characteristic may be assigned the effectiveness of that difference in KPI.

Machine learning algorithms and hierarchical-based models are used to perform this signal processing step. The system parses through the KPI history data which is compared to the broadcast event records 20 in order to test the characteristics in each broadcast event record 20 and to optimize each.

In some cases, broadcast events having identical or substantially similar characteristics generate different effectiveness results. In these circumstances the KPI data is used to improve the machine learning observation pool. The multiple effectiveness ratings may be averaged or used to generate a hierarchical model. For example, where a user runs two ads on ESPN in primetime, one time the ads generated 450 app downloads, the other time it generated 10 app downloads. One result is to take simple averages (e.g., "20" effectiveness). In some embodiments, the system generates a hierarchical model for the distribution of the response of running the ad on ESPN prime time. These details go into the machine learning optimization output.

The optimization process can be, e.g., a non-linear, combinatorial tradeoff optimization process over a large number (e.g., thousands) of variables. For example, a client can have a choice of 70 cable networks as platform for serving advertisements or marketing campaigns. There are two types of availabilities: national or local. The client has choices of two creative assets (e.g., video advertisements). There are two choices of length for the creative assets: 15-seconds and 30-seconds. There are six day-part rotations (in other words, the broadcast day is divided into six parts). There are choices of seven days of the week for broadcasting. In combination, the marketer faces 23,500 decision variables. Instead of just relying on a buyer's intuition to make the complex decisions, the disclosed technology provides a marketing solution based on the non-linear, combinatorial tradeoff optimization over existing data.

Figure 5:
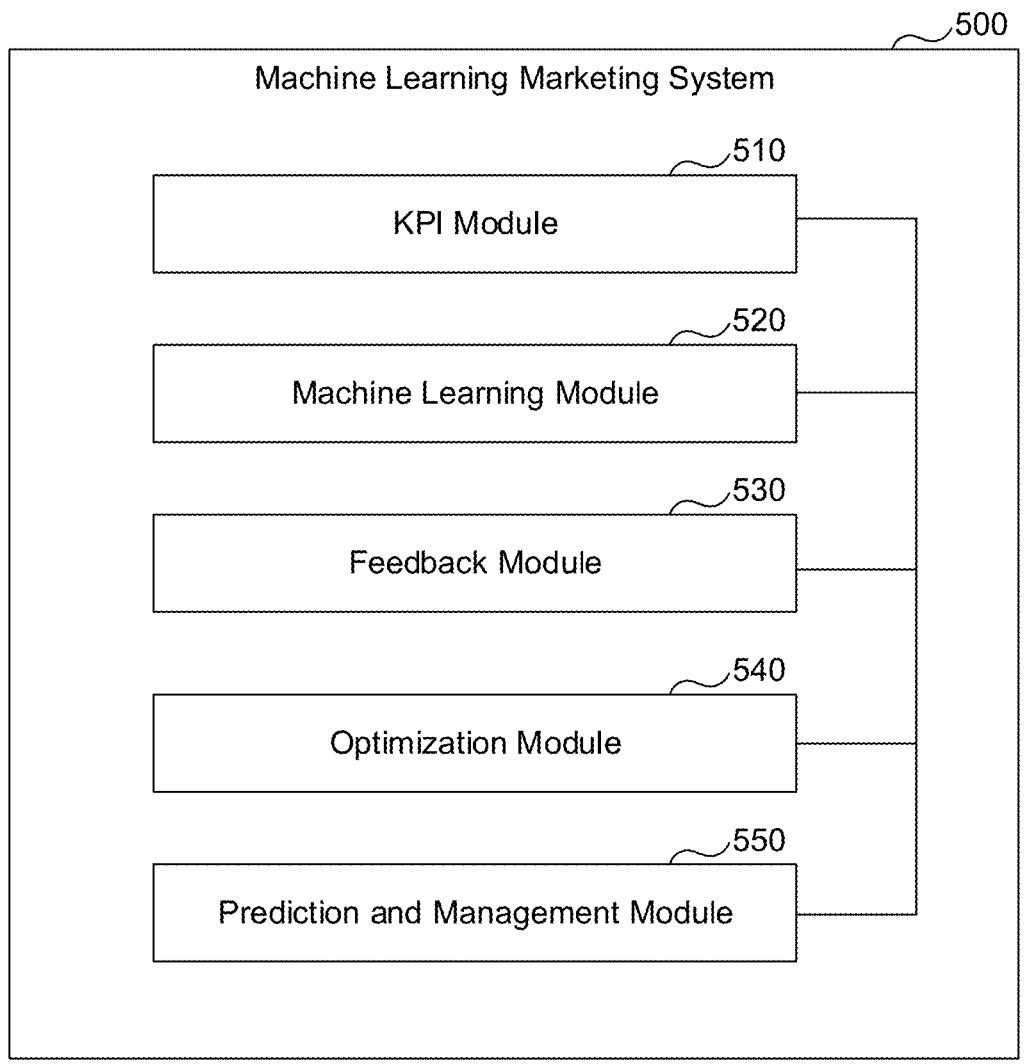
FIG. 5 illustrates modules of a machine learning marketing strategy system according to the disclosed technology.

FIG. 5 illustrates modules of a machine learning marketing strategy system according to the disclosed technology. As illustrates in FIG. 5, the machine learning marketing system 500 includes a KPI module 510, a machine learning module 520, a feedback module 530, an optimization module 540, and a prediction and management module 550. The KPI module 510 defines the outcome KPIs (key performance indicators) that the marketing platforms (e.g., TV networks for serving advertisements) should drive. For example, the KPIs can include visits to a website or an app, sign-ups of a website or an app, leads to a website or an app, phone calls, app downloads, or awareness of a product or a concept, etc. In some embodiments, the KPI module 510 does not necessarily focus dogmatically on a particular KPI, regardless of the advertiser or the circumstances. Instead, the KPI module 510 focuses on client KPIs that are measurable and are meaningful marketing outcomes. As a result, the marketing strategy system 500 can make marketing investment decisions based on the relationships of the KPIs to what is important, rather than just what is easy to measure.

The machine learning module 520 parses existing KPI history data to develop an effectiveness profile of given broadcast events and/or more granular characteristics of broadcast events. In embodiments where existing KPI history data is undeveloped, the machine learning module 520 makes use of external marketing data to complete an observation phase. The external marketing data chosen may relate to competing products/services or be purchasable set-top box (STB) data.

In a cold start situation, where a brand new advertiser has never aired a broadcast event, the system may employ external data. Granular STB data (e.g., post-logs of set-top boxes with time stamps) can provide detailed viewing habits and patterns of an audience. The model then can use the STB data as initial data to predict an audience's response. For example, the system can predict the effectiveness of a broadcast event on a TV channel, at a certain time, for a certain group of audience. Eventually, the system can gradually wash out the STB data once the advertiser receives data for the actual response to the advertisement.

During the signal processing, the machine learning module 520 estimates a base line level of a KPI and then recognizes an effect of an advertisement to the curve of the KPI response. In some embodiments, the machine learning module 520 estimates the effect using a Gibbs sampler. As a result, the machine learning module 520 has an enhanced ability to deal with the problem of event collision, and to avoid "splitting the difference" between proximate airings.

In some embodiments, the machine learning module 520 does not necessarily use simple deviation-from-baseline methods to gauge spot impact. Instead, the machine learning module 520 uses a combination of signal processing and wave decomposition techniques to more robustly estimate impact. For example, if two broadcast events are in spot collision (e.g., five seconds apart), the system can decompose the effect by assigning credits or weights to each of the advertisement events individually. Thus, the system can estimate the impact of each event (also called spot or errand). As a result, the machine learning module 520 provides a solution to the problems of response latency and spot collision. In some embodiments, the shape of all effectiveness curves are parameterized (e.g., by characteristics of FIG. 4). In other words, the shape of a curve can be determined by parameters (e.g., two parameters).

Hierarchical Bayes Model

In some embodiments, the intervals of data are treated as outcome variable depending on different things. The values of the intervals represent levels of response from the advertisements. The response outcomes can be treated as a function of dimensions of the decision variables. For example, the system not only knows the time stamps indicating when broadcast events concluded, but also knows the characteristics of broadcast events, such as the network that the advertisement was on, the rotation, the time, the availability, etc. In some embodiments, the function is a hierarchical Bayes model. The model exploits independence of relationships, and learns from small data sets.

The model can particularly help newer advertisers. For example, a marketer puts the advertisement on air for a month and would like to start optimizing the marketing strategy. The hierarchical Bayes model is able to provide an effective strategy, even with a relatively small data set. If the advertiser does not have much data for a combination of a particular configuration, the system can use related data (hierarchical data) to predict the performance for the particular configuration.

For example, a marketer may not have a lot of observations of a given TV channel in an overnight time slot. However, the advertiser has observations on that TV channel at different times of the day and has observations on overnight time across other networks. The model can use the information to make an educated inference at what the given TV channel in the overnight timeslot will have for an effectiveness rating of future broadcast events on certain KPIs. These types of machine-learning inferences enable the system to generate effectiveness ratings for broadcast event characteristics where there is no KPI history data.

Regime Switching

In some embodiments, the machine learning module 520 can consider regime switching. The relationships between products/services and audiences change over time. For example, by introducing new programming or dropping existing programming, the marketers can gain or lose a certain audience for the product/service. By looking for different cutoff points in time, the module determines whether there is a significant difference in the performance of a KPI in recent time versus in the more distant past. A cutoff point in time is a time occurring at some period after the conclusion of a broadcast event (i.e., after the time stamp corresponding to a broadcast event). A cutoff point in time can split a time period following the conclusion of a broadcast event into two time periods, one occurring before the cutoff point in time and one occurring after the cutoff point time.

Figure 6:
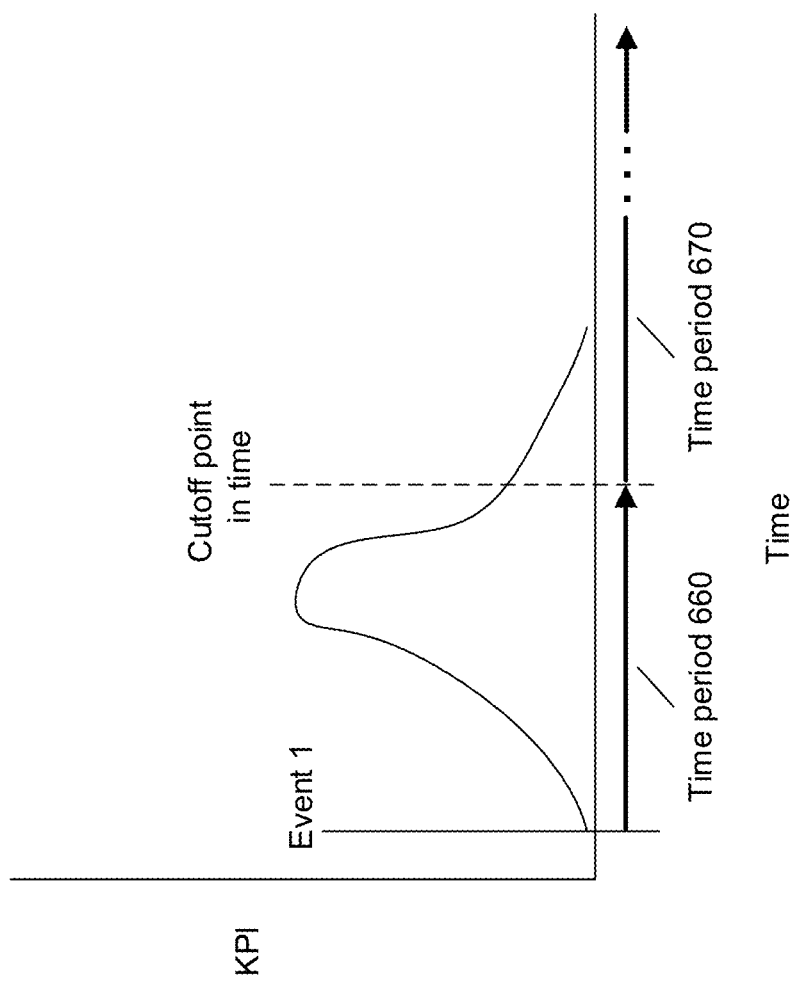
FIG. 6 illustrates a graphical plot of quantifiable metric measured as a function of time and including a cutoff point in time for regime switching.

FIG. 6 illustrates a graphical plot of quantifiable metric measured as a function of time and including a cutoff point in time for regime switching. The vertical line labeled "Event 1" indicates the time at which event 1 concluded. The dotted vertical line labeled "cutoff point in time" indicates the time at which a cutoff point in time exists. A first time period 660 may start right after the conclusion of the broadcast event and continue until the cutoff point in time, while a second time period 670 may start at the cutoff point in time and continue indefinitely. In some embodiments, the second time period 670 may continue until another cutoff point in time. In other embodiments, a first time period may start at a first cutoff point in time and continue until a second cutoff point in time, while a second time period may start at the second cutoff period in time and continue indefinitely or until another cutoff point in time.

Machine learning module 520 may analyze the effectiveness of a broadcast event using any of the methods described herein for the time periods separated by cutoff points in time. Based on this analysis, the module may find that the effectiveness of the broadcast event measured by KPI is higher during one time period than that measured during another time period. With respect to the example shown in FIG. 6, the module can analyze the effectiveness of event 1 by integrating the curve over time period 660 and by integrating the curve over time period 670. Since the area under the curve is greater for time period 660, this would show that the effectiveness of event 1 was greater during time period 660 compared to that during time period 670. While FIG. 6 shows an example of a cutoff point in time with regards to the quantifiable metric measured for one event, embodiments are not so limited. Cutoff points in time can be used to analyze quantifiable metrics measured for multiple events, such as those with overlapping attribution curves as shown in FIG. 2 and FIG. 3.

In other words, machine learning module 520 determines whether the KPI is materially improved or materially degraded in its performance over time after the conclusion of the broadcast event. Without regime switching, the module will look back at all the historical data, which may not be indicative of current effectiveness of a broadcast event. With regime switching, the module can use an appropriate amount of recent KPI measurement history to predict future performance. The module determines the cutoff of the recent history as a dynamic threshold, instead of a static threshold. The data before the regime-switching cutoff point can be ignored.

In some embodiments, instead of examining the effectiveness of an individual broadcast event, the system can observe a combinatorial effect of running broadcast events together. For example, if a broadcast event runs in one channel and runs another broadcast event in another channel, the system can estimate the combinatorial or interactive effect. The effect can be either positive or negative. For example, these channels used can share an audience, or the audience is channel hopping. It's possible for an audience to see a broadcast event twice, even though the audience is in two different channels. Similarly, the system can determine whether it's better to have a single creative asset (tone) or multiple creative assets. In some cases, the system can have multiple messaging channels. Whether a positive or negative combinatorial effect, the system generates actionable data.

To account for the change in effectiveness of a broadcast event, the optimization module 540 performs regime switching on the media inputs as a function of their weights and variables. A regime can be defined as a duration of time in which the effectiveness is deemed relevant. At the cut-off, the optimization module will reset how much data is kept over time.

In other words, if there is no relationship that exists between one advertisement airing on ESPN and the same advertisement running on ESPN2, the two events are mutually exclusive. On the other hand, if there is a combinatorial effect between the two events, a positive or negative effect can be calculated and may be represented as a quadratic problem.

Another situation to consider is if the two networks share the same audience, as the example networks ESPN and ESPN2 normally do. Many people may be changing the channel back and forth between the two networks and could observe the same advertisement on both networks, the audience member essentially being counted twice for observing the event.

In another situation, having multiple messaging channels, or advertisements, can be superior to airing the same advertisement. The optimization module can calculate if the expected value of each of the different advertisements, that all stem from the same advertiser, yields different results than airing one advertisement.

The feedback module 530 continuously feeds in new marketing data to the system 500 and re-optimizes. In other words, the system 500 constantly adapts to changing audience behaviors and media variables.

Based on the machine learning results, the optimization module 540 optimizes a broadcast event spending schedule, subject (of the advertiser) to constraints. The constraints can include, budget, day of week, or national or local availabilities, inventory status (e.g., whether an advertisement slot will likely be sold out), age suitability, spending timeframe, etc. In some embodiments, the optimization module 540 does not necessarily make marketing investing decisions just based on intermediate variables (e.g., impressions) or simple heuristics (e.g., audience indexing, efficiency heat maps, etc.). In some embodiments, the result of the optimization is to maximize a sum of the expected consumer responses. The optimization module 540 avoids the cognitive biases that are inevitable in constructing media strategies in human heads.

Based on the optimization, the prediction and management module 550 forecasts KPI outcomes and enables fast scenario modeling. The marketing strategy system 500 can further execute the strategy by submitting orders. The system can also produce automated sensitivity analysis and provides scenario modeling of a dollar's incremental effect on the audience response.

The system can provide architecture for a front-end server and back-end server, both being able to communicatively interact with the decision variables database, a user interface, the machine learning application, and the optimization application. Additionally, a user can access and input desired KPIs into the user interface, which can display a visual representation of trends, budget allocation, and scenario modeling.

In some embodiments, the model takes into account that a given broadcast event fades in effectiveness over time. One explanation for this is that consumers either get bored or are saturated with the content of the broadcast event (e.g., a television advertisement that predominantly features a particular pun as a joke gets old to viewers). The given broadcast event has a peak effectiveness rating when first implemented. Each curve has a peak effectiveness, and, as time progresses, the effectiveness decreases. Other examples for this are an unstable relationship between the viewership of televised NBA games during the championship finals games, regular season games, and no games during the off-season. More generally, different networks and the regular programming that the network airs will ebb and flow as the audiences' interests change. Different networks are continually observing an increase or decrease in viewership or introducing new programming or canceling programming.

Figure 7:
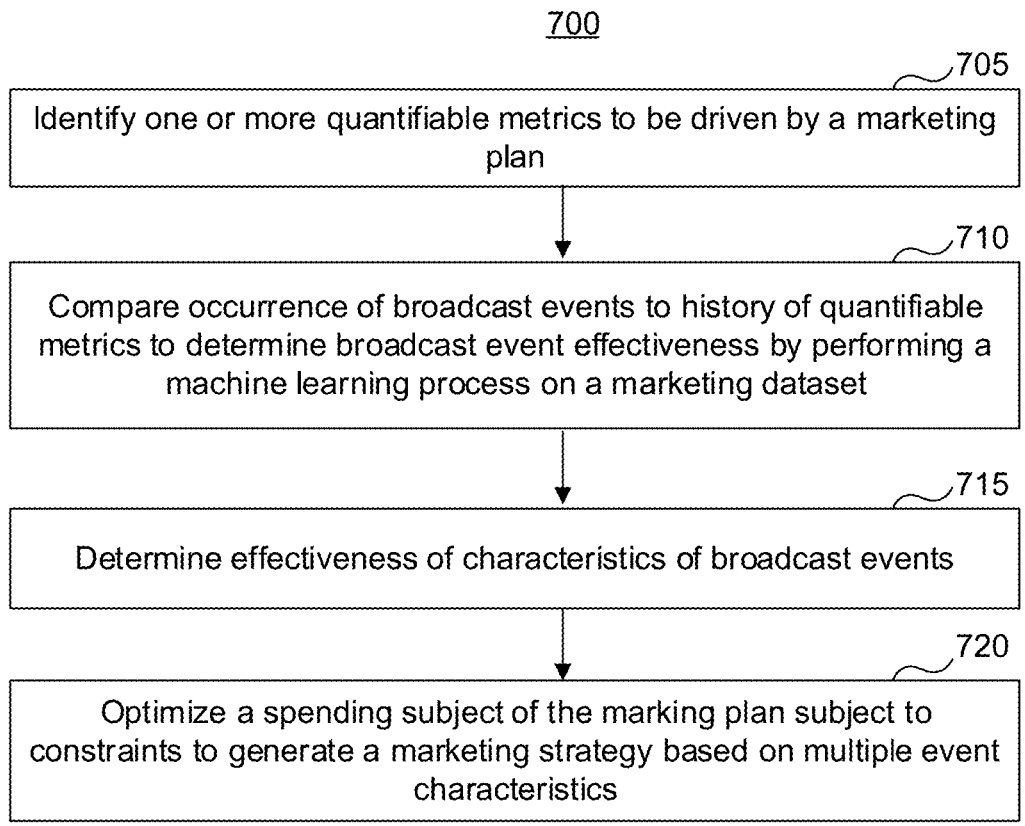
FIG. 7 illustrates a sample process of determining a machine learning marketing strategy.

FIG. 7 illustrates a sample process 700 of determining a machine-learning marketing strategy. FIG. 7 illustrates a sample process of analyzing marketing data using machine learning. FIG. 7 illustrates a sample process of optimizing marketing media strategy based on machine learning.

In step 705, a the system identifies one or more quantifiable metrics from which effectiveness of broadcast events is determined. This decision may be user generated or based on the product/service offered. In step 710, the system compares occurrence of broadcast events to history of quantifiable metrics to determine broadcast event effectiveness by performing a machine learning process on a marketing dataset.

Step 710 is a machine learning signal processing phase. Raw data is input into a machine learning module to be normalized in a signal processing stage. A parsing module can exist in the machine learning module to automatically parse through the data, both input and output data.

In step 715, based on the comparison of the quantifiable metric to individual broadcast events, the system determines an effectiveness rating for each of the broadcast events. Additionally, each broadcast event is compared to other broadcast events in order to isolate and determine effectiveness of characteristics of each broadcast event.

In step 720, the system optimizes a spending subject of the marketing plan subject to constraints to generate a marketing strategy based on multiple event characteristics.

Figure 8:
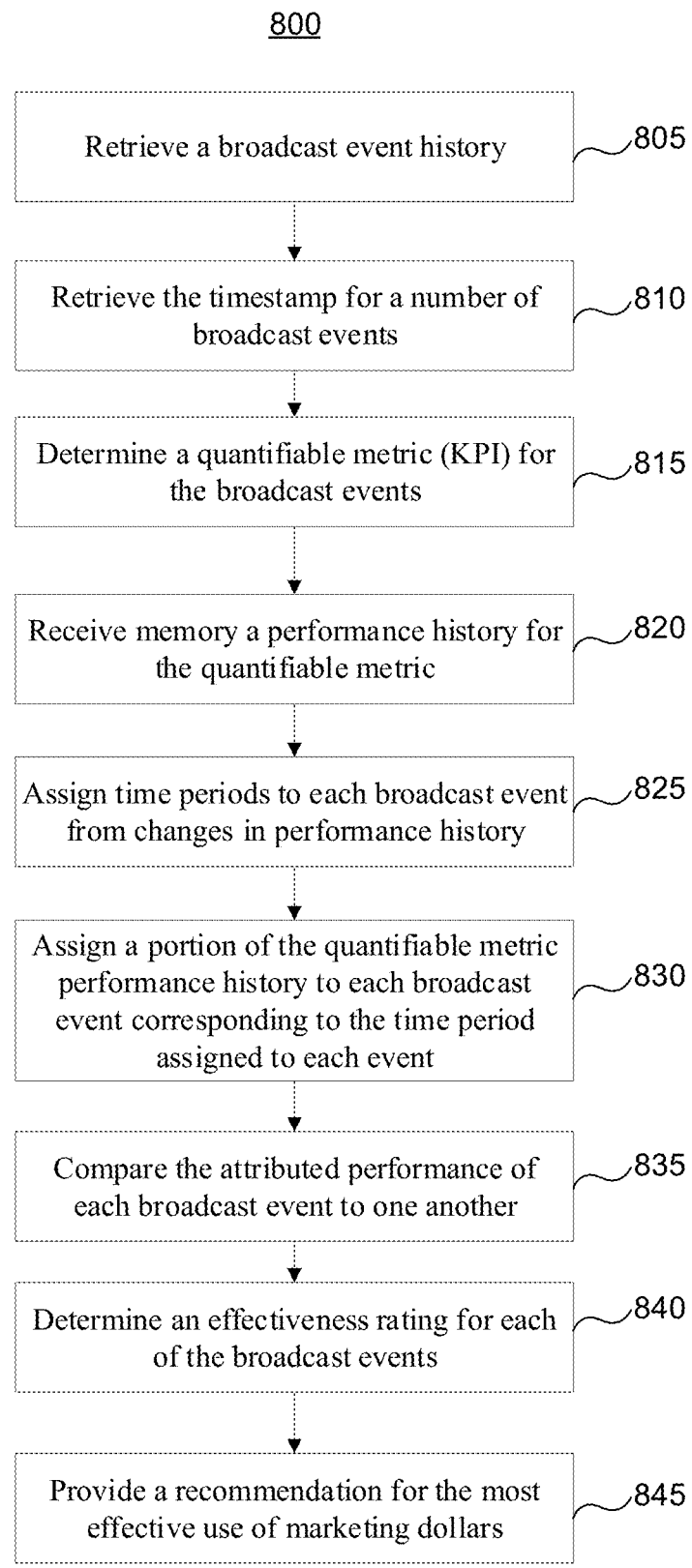
FIG. 8 is a flow chart illustrating an effectiveness rating process.

FIG. 8 is a flow chart illustrating an effectiveness rating process 800. In step 805, the system stores in memory a broadcast event history. The broadcast event history includes metadata of a plurality of broadcast events. Among the metadata are details such as a time stamp, a medium, channel, venue, content, tone, magnitude, time slot, and cost.

In step 810, the system retrieves the time stamp for a number of broadcast events. A time stamp for a broadcast event indicates the time when the broadcast event concluded. In step 815, the system determines a quantifiable metric (KPI) for the broadcast events. In step 820, the system stores in memory a performance history for the quantifiable metric. The performance history includes the quantifiable metric measured as a function of time.

In step 825, the system assigns time periods to each broadcast event based on changes in the performance history data occurring after the time stamps of the broadcast events (i.e., after the conclusion of the broadcast events).

In step 830, the system assigns a portion of the quantifiable metric performance history to each broadcast event corresponding to the time period assigned to each event. In some embodiments, rather than assigning all of the metric performance within the time periods, a portion or subset of the performance over the time period is attributed directly to given broadcast events. Time periods (and therefore all of a metric's performance within that time period) are attributed to broadcast events where there is little spot collision. Conversely, portions of the metric performance within a time period are assigned to broadcast events where one collides in time with another.

In step 835, the system compares the attributed performance of each broadcast event to one another. In step 840, the system determines an effectiveness rating for each of the broadcast events. In some embodiments, the system determines an effectiveness rating for specific characteristics of each broadcast event. Finally, in step 845, the system provides a recommendation for the most effective use of marketing dollars on future broadcast events.

Constrained Optimization

Within the optimization module, a user can prescribe constraints upon the media decisions, KPIs, and miscellaneous inputs. The constrained optimization module prompts the user to enter, into a graphic user interface, the values of importance. Based on the input values, the constrained optimization module performs a variation of the maximization process described previously. The constrained optimization module calculates the expected value of the function based on the constraints, then finds the parameter that maximizes the function such that it converges to a maximum likelihood estimate of a parameter. In other words, the constrained optimization will iterate through calculating the expected value and maximizing a parameter until it yields a best estimate.

In some scenarios, a user can specify the budgetary constraints, specifically relating to how much money they have to spend for a particular advertisement, or indicating what percentage of the user's overall budget needs to be allocated to a certain time frame, such on a weekend or during primetime. A user can also specify how much inventory is available by the manufacturers or retailers for the product being advertised. Another constraint that can be placed on the advertisement relates to Broadcast Standards and Practices, such that the network airing the advertisement is responsible for the moral, ethical, and legal implications. These Standards and Practices extend beyond advertisements to the programs themselves. For example, it would not be up to Broadcast Standards and Practices to air an advertisement targeted to mature audiences on family-friendly networks or during mid-day when children may be watching television.

Graphical User Interface (GUI)

A user can log in to a graphical user interface to see a dashboard of metrics. For example, the dashboard can display to a user what the money they invested was spent on, and the costs for registering a targeted user on all of the indicated networks at different times. The information is generated automatically via the machine-learning module and optimization module, and can be interpreted as the reasoning for an executable media decision.

Effectiveness Measured Based on Nearby Device Usage

Some embodiments disclosed herein involve determining whether device usage related to a given advertisement has occurred by devices operated by the same user of a smart television that recently played the advertisement. For example, someone who is using their mobile device (e.g., smart phone or tablet) could be watching a show on their smart television at the same time. After watching an advertisement that plays on the smart television, that individual may use their mobile device to search or purchase the item advertised. A server is enabled to analyze data from the smart television, mobile device, or other sources to determine whether such device activity related to the advertisement occurred following the conclusion of the advertisement. If a positive determination is made, this is considered a conversion on the advertisement. Information related to the conversion (e.g., location of device when conversion occurred, time stamp indicating when the conversion occurred, specific search terms used, browser or application used, length of time spent on said browser or application, purchase details if purchase occurred, etc.) can be stored to perform machine learning marketing strategies as described herein to analyze effectiveness of the advertisement. Exemplary system and method for gathering and analyzing such data are described below. Any advertisement that is referenced below is considered a broadcast event.

Figure 9:
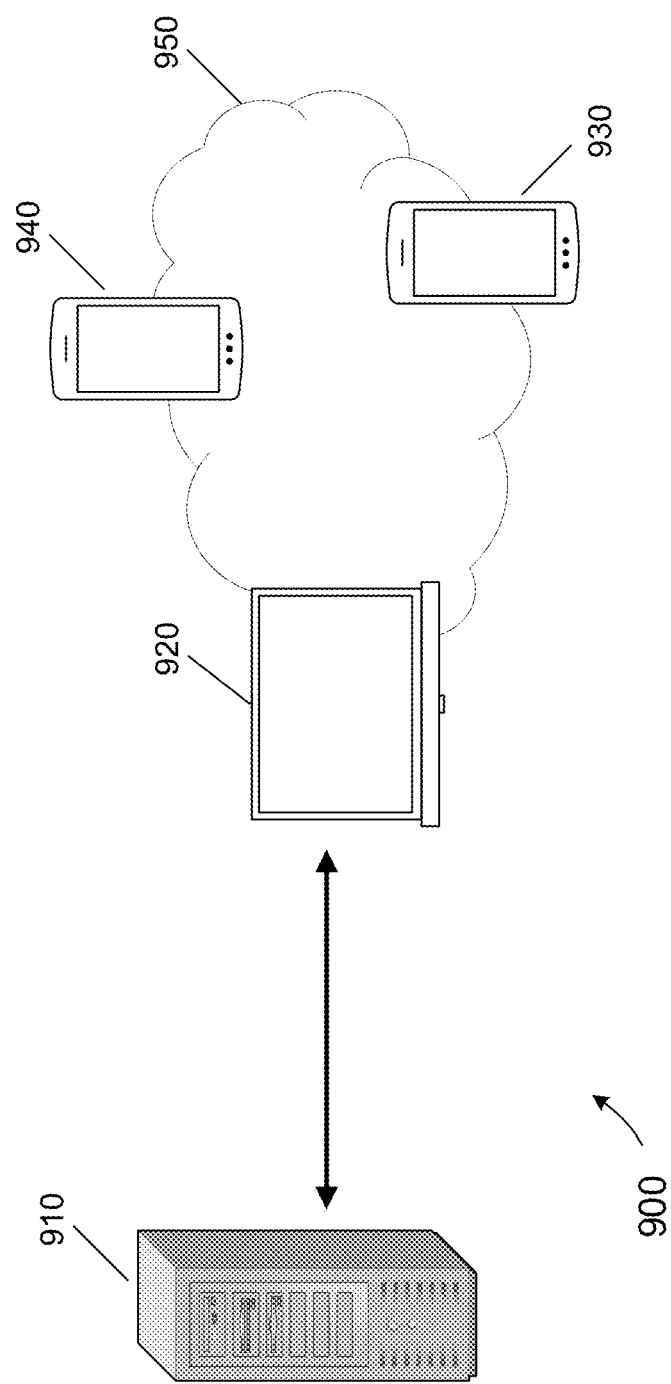
FIG. 9 illustrates a diagrammatic representation of a system in which data can be gathered from devices other than the devices that displayed a broadcast event.

FIG. 9 illustrates a diagrammatic representation of a system 900 in which data can be gathered from devices other than the devices that displayed a broadcast event. FIG. 9 includes server computer 910, smart television 920, mobile device 930, mobile device 940, and communications network 950. Communications network 950 may be any suitable network (e.g., wireless LAN) that allows devices connected to the network to communicate with each other. For example, communications network 950 may be a Wi-Fi network for a household, a cafe, a hotel, an event center, or an amusement park. In some cases, communications network 950 may be a network of a shared or paired application. Smart television 920, mobile device 930, and mobile device 930 may all be connected to communications network 950. Server computer 910 may be in communication with smart television 920 over any suitable communication network that allows remote devices to communicate with each other. Server computer 910 can perform machine learning marketing strategies as described herein based on information received from smart television 920, mobile device 930, mobile device 940, or other device.

Embodiments are not just limited to the configuration shown in FIG. 9. In other embodiments, smart television 920 may instead be any another device that can display advertisements and communicate with other devices, such as a personal computer. Further, there may be additional smart televisions, personal computers, mobile devices, or other devices connected to communications network 950.

Figure 10:
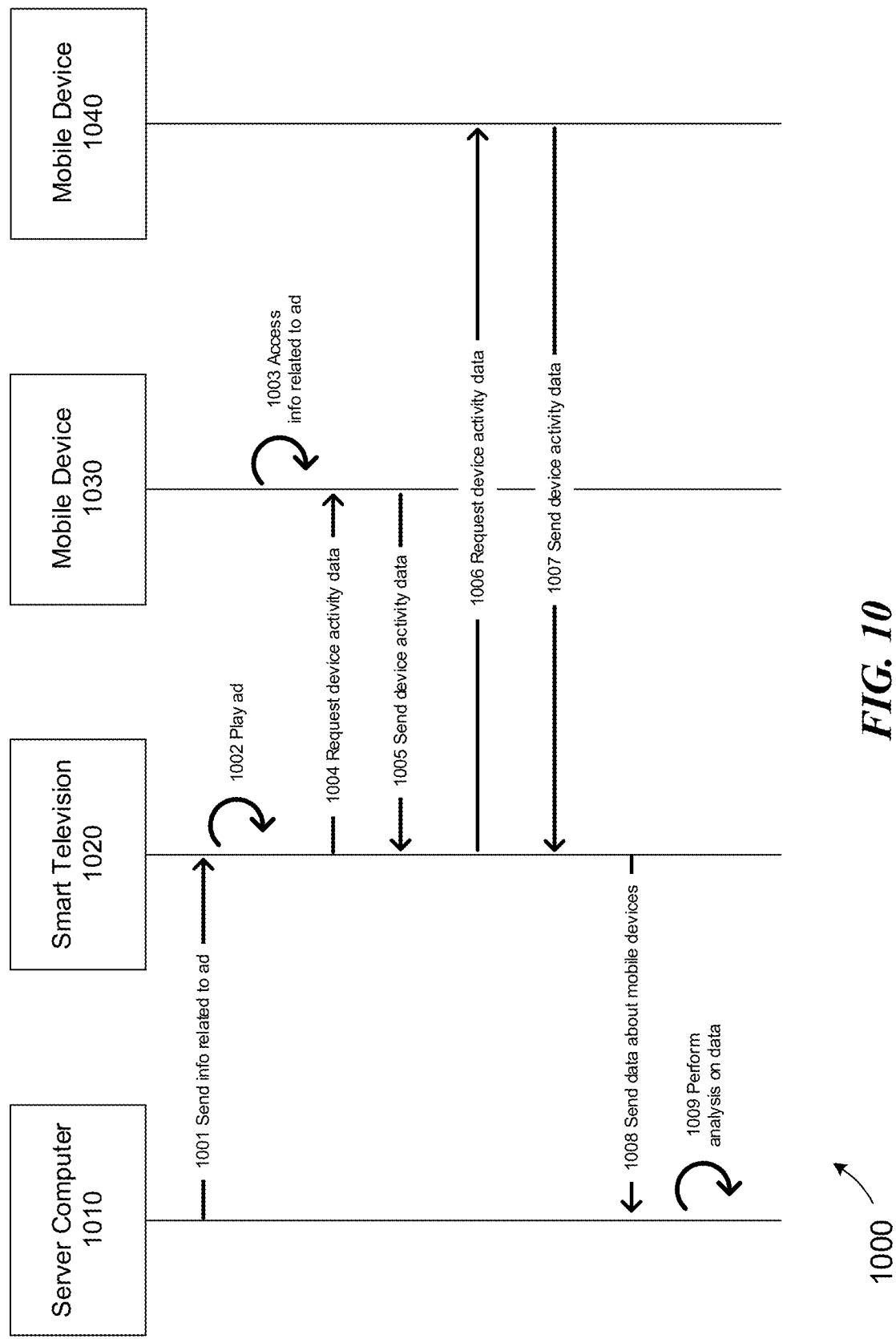
FIG. 10 is a flow diagram illustrating an exemplary method for measuring the effectiveness of a broadcast event.

FIG. 10 is a flow diagram illustrating an exemplary method 1000 for measuring the effectiveness of a broadcast event. FIG. 10 includes server computer 1010, smart television 1020, mobile device 1030, and mobile device 1040, which may have characteristics similar to devices described with respect to FIG. 9. Smart television 1020, mobile device 1030, and mobile device 1040 may be connected to the same communication network (e.g., communications network 950 of FIG. 9). Methods are not limited to the steps shown in FIG. 10 and instead may include fewer or additional steps compared to what is shown. Further, smart television 1020 may instead be any another device that can display advertisements and communicate with other devices, such as a personal computer.

At step 1001, server computer 1010 sends information to smart television 1020 to enable smart television 1020 to play an advertisement. The advertisement may be of any suitable format that can be displayed or played on smart television 1020. For example, the advertisement can be an embedded video advertisement that plays while a video is viewed on an online video platform (e.g., Youtube, TikTok, etc.) or while content is streamed on Hulu, Sling TV, or the like. The information sent at step 1001 may include any of a request to play an advertisement, video files corresponding to the advertisement, information (e.g., business rules) associated with the channel or streaming platform on which the advertisement will play, one or more time stamps indicating the time at which the advertisement should start or end, and other metadata for enabling the playback of the advertisement. While not shown, server computer 1010 may take other steps prior to step 1001 to ensure that information related to the appropriate advertisement is sent (e.g., based on what channel or streaming platform is being used by smart television 1020).

At step 1002, smart television 1020 receives the information sent by server computer 1010 and uses the information to play the advertisement.

At step 1003, an individual using mobile device 1030 may access information related to the advertisement. For example, they may access a website of a product or company or make a purchase on a shopping platform that was advertised in the advertisement. This is considered a conversion on the advertisement. Meanwhile, there may be no similar conversion performed on mobile device 1040, which could be operated by the same or different person.

At steps 1004 and 1005, smart television 1020 communicates with mobile device 1030 over communications network 950 to determine whether there was a conversion on the advertisement played in step 1002. Communications network 950 can be a Wi-Fi network to which both smart television 1020 and mobile device are connected, or it may be a network of a shared or paired application. In some embodiments, smart television 1020 and mobile device 1030 may both have compatible applications or software installed that enables them to communicate with each other over communications network 950. Mobile device 1030 sends a message to server computer 1010 indicating that its browser or other application was utilized to conduct a search related to the advertisement shown in step 1002. In some embodiments, mobile device 1030 may send the message in response to a request from smart television 1020. In other embodiments, mobile device 1030 may periodically and automatically send information indicating various activities performed on mobile device 1030 (e.g., search history, application usage, etc.) to smart television 1020. The message may include additional information besides an indication of whether there was a conversion, such as details indicating user activity of mobile device 1030 (e.g., location of device when conversion occurred, time stamp indicating when the conversion occurred, specific search terms used, browser or application used, length of time spent on said browser or application, purchase details if purchase occurred, etc.).

At steps 1006 and 1007, smart television 1020 communicates with mobile device 1040 over communication network 950 to determine whether there was a conversion on the advertisement played in step 1002. While steps 1006 and 1007 are shown to occur after 1004 and 1005 in FIG. 10, embodiments are not so limited. Steps 1006 and 1007 can occur concurrently with steps 1004 and 1005, or prior to steps 1004 and 1005. Mobile device 1040 may communicate with smart television 1020 in a similar manner to that described with respect to mobile device 1030 in steps 1004 and 1005. However, since there was no conversion with respect to mobile device 1040, it may send a message to smart television 1020 indicating that there was no conversion. In other embodiments, smart television 1020 may determine that there was no conversion on the advertisement with respect to mobile device 1040, based on a lack of response from mobile device 1040 for a certain period following the request by smart television 1020 or conclusion of the advertisement.

At step 1008, smart television 1020 sends information that it determined about mobile device 1030 and mobile device 1040 to server computer 1010. The information may include an indication that there was a conversion of an advertisement from mobile device 1030 but not from mobile device 1040. The information may include additional details indicating user activity on mobile device 1030 (e.g., location of device when conversion occurred, time stamp indicating when the conversion occurred, specific search terms used, browser or application used, length of time spent on said browser or application, purchase details if a purchase was made, etc.).

While the steps above describe that smart television 1020 determines whether conversions of an advertisement took place, embodiments are not so limited. In other embodiments, smart television 1020 may simply send information regarding user activity of mobile device 1030 and mobile device 1040 (in response to a request from smart television 1020 or periodically) to server computer 1010, after which server computer 1010 may determine whether a conversion occurred. To do so, server computer 1010 may analyze whether the time at which certain user activity occurred on a mobile device was within a certain time period following the conclusion of the advertisement.

At step 1009, server computer 1010 may receive information sent by smart television 1020 in step 1008 and perform machine learning marketing strategies and analysis as described herein based on the received information. Server computer 1010 may store any of the information received from smart television 1020 as KPI measurements that can be used to measure the effectiveness of the advertisement played in step 1002. An exemplary KPI curve, which plots KPI measurements as a function of time, may indicate the number of conversions (or other metric determined based on the number of conversions) that occurred by devices other than a plurality of smart televisions that played a given advertisement.

Server computer 1010 may aggregate data received across a plurality of smart televisions. By doing so, server computer 1010 can analyze both micro data, indicating effectiveness of an advertisement with regards to specific individuals, and macro data, indicating effectiveness of an advertisement across a larger audience.

In some embodiments, there may be issues that prevent smart television 1020, mobile device 1030, and mobile device 1040 from both having compatible applications or software installed that enables them to communicate with each other over communications network 950. For example, users of mobile devices 1030 and 1040 may only be planning to connect to communications network 950 temporarily (e.g., only during visit to cafe) and downloading of such applications and software would be inconvenient. There may also be privacy issues with smart televisions and mobile devices communicating with each other simply by being connected to the same communication network.

In such scenarios described above, the flow described with respect to FIG. 10 may be altered to accommodate these issues. For example, steps 1004 through 1008 can be omitted. Instead, at step 1009 server computer 1010 can perform additional analyses like described below to determine whether conversions occurred amongst devices used near smart televisions playing a given advertisement.

In some embodiments, server computer 1010 generates and stores server-side profiles of groups of related devices. The profile data may be stored in a database or the like. In some cases, server computer 1010 may store a profile for each smart television, where each profile includes information indicating the identity of a plurality of devices (device identification information) associated with the smart television. In other cases, server computer 1010 may store a profile for each user, where each profile includes information indicating the devices owned or used by each user. Users may input information indicating the devices to be included in a profile during a registration process or the like. With regards to the system and method described in FIG. 9 and FIG. 10, server computer 1010 can generate a profile identifying smart television 1020, mobile device 1030, and mobile device 1040 as related or linked devices.

Meanwhile, server computer 1010 may continue to receive or retrieve device activity data and device identification data from various sources. For example, some mobile applications sell device activity data and associated device identification data to third party entities. Device activity data includes any data that indicates details about how a user has used their device (e.g., what websites or apps were visited at what time, what videos were watched at what time, what search terms were searched at what time, etc.). Device identification data includes any data that indicates details regarding the identity of a device (e.g., device type, device identification number, owner name, etc.). Device activity data may be associated with device identification data to show which device was used to perform what activities. Server computer 1010 may receive or retrieve such available device activity data and associated device identification data.

In one embodiment, server computer 1010 may determine whether the available device identification data includes information identifying a device that is part of any of the profiles stored by server computer 1010. For example, server computer 1010 may determine that the device identification information includes a device identifier associated with mobile device 1030. After determining that mobile device 1030 is within the same profile as smart television 1020 and thus mobile device 1030 and smart television 1020 are linked, server computer 1010 may determine whether any advertisements that were played by smart television 1020 are related to activities for which mobile device 1030 has been used. For example, if the advertisement played on smart television 1020 in step 1002 were advertising a product, server computer 1010 would analyze whether device activity data associated with mobile device 1030 indicates that activities related to the product occurred (e.g., internet searches of the product, online purchases of the product, etc.) and that they occurred within a certain time period following the advertisement. If server computer 1010 determines that the device activity data does show that mobile device 1030 was utilized to perform activities related to the product within a given time period after the conclusion of the advertisement, server computer 1010 would identify such activity as a conversion on the advertisement. Server computer 1010 can then store information indicating the details surrounding the conversion on the advertisement by mobile device 1030 to use for machine learning marketing strategies and analysis described herein.

In another embodiment, instead of first determining whether device identification data includes information identifying a particular device, server computer 1010 may filter the available device activity data and associated device identification data based on any number of factors. For example, server computer 1010 may filter the available data to retrieve only device activity data and associated device identification data for activities related to a certain product, such as internet searches for the product or viewing a video related to the product. Server computer 1010 may further filter the available data to retrieve only device activity data and associated device identification data that occurred after a certain time and/or within a certain time period. Server computer 1010 may filter the data in this way because the product is related to the given advertisement for which server computer 1010 will analyze its effectiveness, and only activities that occur within a time period following the conclusion of the advertisement may be relevant.

Server computer 1010 then analyzes the filtered device activity data and associated device identification data to determine whether any conversions on a given advertisement occurred. To do so, server computer 1010 determines whether the filtered device identification data includes information identifying a device that is part of any of the profiles stored by server computer 1010. For example, server computer 1010 may determine that the filtered device identification information includes a device identifier associated with mobile device 1030. This indicates that mobile device 1030 was utilized to conduct activity related to the product at issue (e.g., internet search of product) within a certain time period after the advertisement. Server computer 1010 can then store information indicating the details surrounding the conversion on the advertisement by mobile device 1030 to use for machine learning marketing strategies and analysis described herein.

Exemplary Computer System

Figure 11:
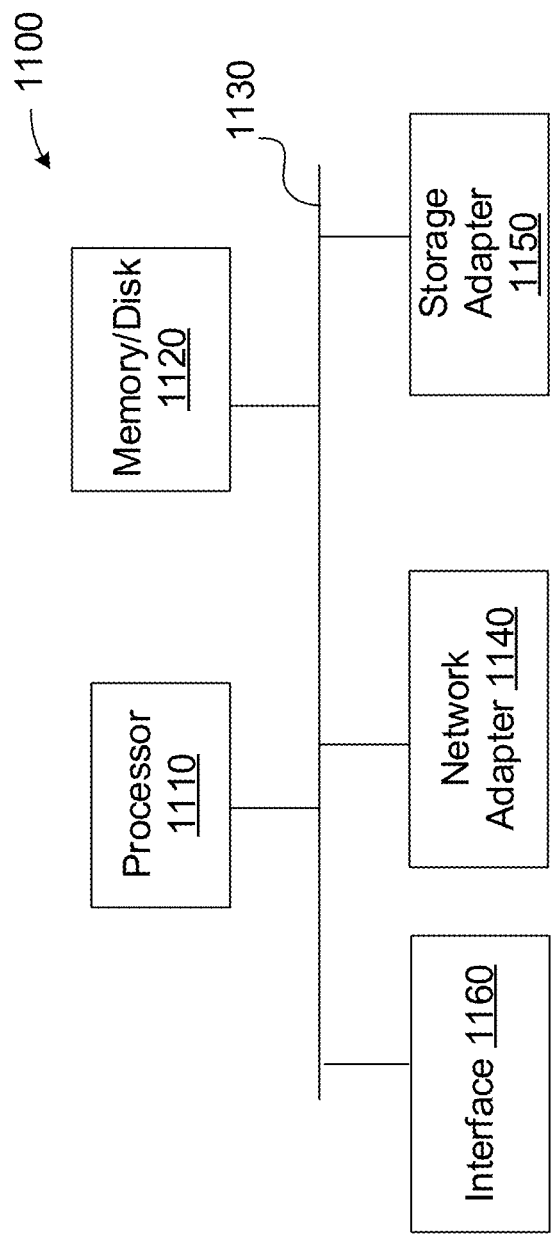
FIG. 11 is a diagrammatic representation of a machine in the example form of a computer system within which a set of instructions, for causing the machine to perform any one or more of the methodologies or modules discussed herein, may be executed.

FIG. 11 is a diagrammatic representation of a machine in the example form of a computer system 1100 within which a set of instructions, for causing the machine to perform any one or more of the methodologies or modules discussed herein, may be executed.

The computer system 1100 includes a processor 1110, memory and non-volatile memory 1120, a communications BUS 1130, a network adapter 1140, a disk interface 1150 and an interface device 1160. Various common components (e.g., cache memory) are omitted for illustrative simplicity. The computer system 1100 is intended to illustrate a hardware device on which any of the components described in the examples (and any other components described in this specification) can be implemented. The components of the computer system 1100 are coupled together via the bus 1130 or through some other known or convenient device.

This disclosure contemplates the computer system 1100 taking any suitable physical form. As an example, and not by way of limitation, a computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1100 may include one or more computer systems 1100; be unitary or distributed; span multiple locations; span multiple machines; or reside in a cloud, which may include one or more cloud components in one or more networks. Where appropriate, one or more computer systems 1100 may perform, without substantial spatial or temporal limitation, one or more steps of one or more methods described or illustrated herein. As an example, and not by way of limitation, one or more computer systems 1100 may perform in real time or in batch mode one or more steps of one or more methods described or illustrated herein. One or more computer systems 1100 may perform at different times or at different locations one or more steps of one or more methods, described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1100. The non-volatile storage can be local, remote, or distributed. The non-volatile memory is optional because systems can be created with all applicable data available in memory. A typical computer system will usually include, at least, a processor, memory, and a device (e.g., a bus) coupling the memory to the processor.

The front-end server interfaces with a user interface, obtaining user inputs relating to, for example, desired KPIs. The front-end server can contain infrastructure to perform user management such as log-in information and advertising account information. In some embodiments, the front-end server can also contain a web server that communicates with a user interface. Some embodiments of the front-end server can contain a rendering module in which it can process a user-inputted request. It can load a page, a layout of the page with CSS and JavaScript, and content of the page.

A back-end server behaves as an intermediary between the front-end server, the database server, the machine learning module, and optimization module. The back-end server performs all the computations and processes input and sends this information back to the front-end server. In one embodiment, the back-end server can contain a data verification module that communicates with the database server to verify that the data stored in either the decision variables database or the KPI database is the most up-to-date data.

Software is typically stored in the non-volatile memory and/or the drive unit. Indeed, storing an entire large program in memory may not even be possible. Nevertheless, it should be understood that for software to run, if necessary, it is moved to a computer readable location appropriate for processing, and for illustrative purposes, that location is referred to as the memory. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1100. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 5 reside in the interface.

In operation, the computer system 1100 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system, and its associated file management system. The file management system is typically stored in the non-volatile memory and/or drive unit and causes the processor to execute the various acts required by the operating system to input and output data and to store data in the memory, including storing files on the non-volatile memory and/or drive unit.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a stand-alone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine, and that cause the machine to perform any one or more of the methodologies or modules of the presently disclosed technique and innovation.

In general, the routines executed to implement the embodiments of the disclosure may be implemented as part of an operating system or a specific application, component, program, object, module or sequence of instructions, referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Further examples of machine-readable storage media, machine-readable media, or computer-readable (storage) media include, but are not limited to, recordable-type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission-type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation; rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements. The coupling or connection between the elements can be physical, logical, or a combination thereof. For example, two devices may be coupled directly, or via one or more intermediary channels or devices. As another example, devices may be coupled in such a way that information can be passed there between, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components (or any combination thereof). Modules are typically functional components that can generate useful data or another output using specified input(s). A module may or may not be self-contained. An application program (also called an "application" or "app") may include one or more modules, or a module may include one or more application programs.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully-functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

What is claimed is:

1. A computer-implemented method for determining measurable responses to a plurality of broadcast events, the computer-implemented method comprising:
    identifying metadata of the plurality of broadcast events, by a processor based on a stored broadcast event history including the metadata, a first time stamp for a first broadcast event of the plurality of broadcast events and a second time stamp for a second broadcast event of the plurality of broadcast events, each broadcast event respectively including at least a time stamp and a channel;
    determining a quantifiable metric to tie to the first and second broadcast events, the quantifiable metric including a plurality of interactions of a user;
    receiving, by a memory, a plurality of quantifiable metric performance history data including the quantifiable metric measured as a function of time, wherein the plurality of quantifiable metric performance history data does not identify attribution to specific broadcast events;
    assigning, by the processor, a first time period to the first broadcast event and a second period of time to the second broadcast event based upon a recorded time of a change in the quantifiable metric in the quantifiable metric performance history data subsequent to a conclusion of each respective broadcast event, wherein the first and second time periods are temporal periods after the first and second time stamps respectively;
    assigning, by the processor, a first portion of the quantifiable metric performance history data to the first broadcast event, the first portion associated with the first time period;
    determining, by the processor, an overlapping portion of the quantifiable metric performance history data, the overlapping portion including quantifiable metric performance history data from the first portion and measured after the second time stamp;
    determining, by the processor, that the overlapping portion is not attributable to the second broadcast event;
    assigning, by the processor, a second portion of the quantifiable metric performance history data to the second broadcast event, the second portion associated with the second time period and not including the overlapping portion; and
    determining, by the processor, an effectiveness rating of the first broadcast event as relative to the second broadcast event based on a comparison of the first portion and the second portion.

2. A computer-implemented method for determining measurable responses to a plurality of broadcast events, the computer-implemented method comprising:
    receiving, by a memory, a plurality of quantifiable metric performance history data including a quantifiable metric measured as a function of time, wherein the plurality of quantifiable metric performance history data does not identify attribution to specific broadcast events;

assigning, by a processor, a first time period to a first broadcast event of the plurality of broadcast events and a second period of time to a second broadcast event of the plurality of broadcast events, each broadcast event respectively including a time stamp and a channel, wherein a length for each of the first and second time periods is assigned based upon a recorded time of a change in the quantifiable metric in the quantifiable metric performance history data subsequent to the time stamp of each respective broadcast event, wherein the first and second time periods are temporal periods after each of the first and second broadcast events conclude respectively;

assigning, by the processor, a first portion of the quantifiable metric performance history data to the first broadcast event, the first portion associated with the first time period;

determining, by the processor, an overlapping portion of the quantifiable metric performance history data, the overlapping portion including quantifiable metric performance history data from the first portion and measured after the second time stamp;

determining, by the processor, that the overlapping portion is not attributable to the second broadcast event;

assigning, by the processor, a second portion of the quantifiable metric performance history data to the second broadcast event, the second portion associated with the second time period and not including the overlapping portion; and determining, by the processor, an effectiveness rating of the first broadcast event as relative to the second broadcast event based upon a comparison of the first portion and the second portion.

3. The method of claim 2, wherein the quantifiable metric are any of key performance indicators (KPIs) including views to a website or an application, sign-ups of the website or an application, downloads of an application, clicks on the website or application, verified purchases, signatures, logins to the website or application, phone calls, and detected user activity on the website or application.

4. The method of claim 2, wherein each broadcast event respectively further includes, a medium wherein the medium is any of:
print;
picture;
video; audio; or
multimedia;
and the channel is any of:
a website;
a television channel;
a streaming video or video on demand service;
a podcast personality;
a radio station; or
signage.

5. The method of claim 2, further comprising:
updating, in the memory, the quantifiable metric performance history data;
updating, by the processor, the first portion and the second portion based on said updating of the quantifiable metric performance history data; and
determining, by the processor, an effectiveness rating of the first broadcast event as relative to the second broadcast event based upon said updating of the quantifiable metric performance history data and the first and second portions.

6. The method of claim 2, wherein each broadcast event further includes an emotional tone and the emotional tone is used as a further basis for said determining an effectiveness rating.

7. The method of claim 2, wherein each broadcast event further includes an event length and the event length is used as a further basis for said determining an effectiveness rating.

8. The method of claim 2, wherein budget, day of week, national or local availabilities, inventory status, age suitability, or spending timeframe is used as a further basis for said determining an effectiveness rating.

9. The method of claim 2, further comprising:
submitting one or more orders to media platforms based on the effectiveness rating.

10. A computer-implemented method for determining measurable responses to a plurality of broadcast events, the computer-implemented method comprising:
receiving, by a memory, a plurality of quantifiable metric performance history data including a quantifiable metric measured as a function of time, wherein the plurality of quantifiable metric performance history data does not identify attribution to specific broadcast events;

assigning, by a processor, a first portion of the quantifiable metric performance history data to a first broadcast event of the plurality of broadcast events, the first portion associated with a first time period after a first time stamp for the first broadcast event;

determining, by the processor, an overlapping portion of the quantifiable metric performance history data, the overlapping portion including quantifiable metric performance history data from the first portion and measured after a second time stamp for a second broadcast event of the plurality of broadcast events;

determining, by the processor, that the overlapping portion is not attributable to the second broadcast event;

assigning, by the processor, a second portion of the quantifiable metric performance history data to the second broadcast event, the second portion associated with a second time period after the second time stamp and not including the overlapping portion;

assigning, by the processor, an effectiveness period to each of the plurality of broadcast events based on a broadcast event history including metadata of the plurality of broadcast events, wherein the plurality of broadcast events each have a time stamp, a channel, and a medium, and wherein the effectiveness period of each broadcast event is a period of time after a conclusion of each respective broadcast event; and determining an effectiveness rating of each of the time stamps, channels, and mediums based on a status of the quantifiable metric during the effectiveness period of each of the broadcast events.

11. The method of claim 10, wherein the quantifiable metric are any of key performance indicators (KPIs) including views to a website or an application, sign-ups of the website or an application, downloads of an application, clicks on the website or application, verified purchases, signatures, logins to the website or application, phone calls, and detected user activity on the website or application.

12. The method of claim 10, wherein the medium is any of:
print;
picture; video;
audio; or
multimedia;
and the channel is any of:

a website;
a streaming video or video on demand service;
a television channel;
a podcast personality;
a radio station; or
signage.

13. The method of claim 10, wherein each broadcast event further includes an emotional tone and an event length, and wherein said determining includes determining the effectiveness rating for the emotional tone and the event length.

14. The method of claim 10, further comprising:
determining, for each combination of the time stamp, the channel and the medium, an associated cost; and
assigning a weight to each effectiveness rating based on an inverse relationship to the associated cost.

15. The method of claim 10, further comprising:
determining a combination effectiveness rating for each combination of the time stamp, the medium, and the channel.

16. The method of claim 15, further comprising:
generating a hierarchical Bayes model to identify the combination effectiveness ratings of unrepresented combinations of the time stamp, the channel, and the medium.

17. The method of claim 15, further comprising:
determining a positive or negative combinatorial effect of two or more broadcast events with substantially similar time stamps based on the combination effectiveness ratings.

18. The method of claim 10, further comprising:
supplementing the quantifiable metric performance history data with household level set-top box data from a data aggregator.

19. The method of claim 10, further comprising:
identifying, within the quantifiable metric performance history data, a regime change; and
dynamically determining a cutoff of the quantifiable metric performance history data based on the regime change.

20. The method of claim 19, further comprising:
determining that a portion of the quantifiable metric performance history data before the cutoff is a baseline portion and the quantifiable metric performance history data after the cutoff is an active portion; and
generating a campaign rating based on a comparison between the active portion to the baseline portion.

* * * * *